United States Patent [19]

Bourdelais et al.

[11] 3,795,452

[45] Mar. 5, 1974

[54] INSTRUMENT FOR AUTOMATICALLY INSPECTING INTEGRATED CIRCUIT MASKS FOR PINHOLES AND SPOTS

[75] Inventors: Roger J. Bourdelais, Essex Junction, Vt.; Dominick Colangelo, Camillus, N.Y.; Robert J. McFadyen; James F. Elliott, both of Syracuse, N.Y.

[73] Assignee: The United States of America as represented by the Secretary of the Air Force, Washington, D.C.

[22] Filed: Feb. 28, 1973

[21] Appl. No.: 336,585

[52] U.S. Cl. ... 356/237, 179/DIG. 37, 250/219 DF, 350/81, 356/200

[51] Int. Cl. ........................ G01n 21/16, G01n 21/32

[58] Field of Search ...... 356/237, 200; 250/219 DF; 179/DIG. 37; 350/81

[56] References Cited

UNITED STATES PATENTS

| | | | |
|---|---|---|---|
| 2,755,702 | 7/1956 | Cook | 250/219 DF |
| 3,176,306 | 3/1965 | Burns | 356/237 |

*Primary Examiner*—Ronald L. Wibert

*Assistant Examiner*—V. P. McGraw

[57] ABSTRACT

An apparatus for automatically detecting pinholes and spots in an integrated circuit photographic mask. The photographic mask is scanned by a television-type camera through a microscope to detect imperfections. Signals representing the imperfection are processed in logic circuitry.

3 Claims, 2 Drawing Figures

INSTRUMENT FOR AUTOMATICALLY INSPECTING INTEGRATED CIRCUIT MASKS FOR PINHOLES AND SPOTS

BACKGROUND OF THE INVENTION

The present invention relates broadly to integrated circuit mask inspection and in particular to apparatus for automatically detecting pinholes and spots in an integrated circuit photographic mask.

In the manufacture of integrated circuit devices the number of operative devices which are produced by a photographic mask is designated as the yield. There are many factors that affect the yield of semiconductor devices, however, one of the major factors is the degree of perfection of the photographic masks which are used in the manufacturing process. One measure of the mask perfection is the relative number of pinholes and spots with respect to the overall mask.

A pinhole is a transparent area in a portion of the mask which is required to be opaque. Whereas, a spot is an opaque area which is required to be transparent region. At the present time there is no industry standard as to the minimum size a pinhole or spot can have and still degrade a semiconductor device which is made from the mask. Since there is a lack of definition, it will be assumed that the spots and pinholes of concern are larger than $10^{-4}$ cm in diameter. The imperfections which are smaller than this are not important since they will act as either scattering centers or as point objects. If the imperfections act as scatters, then their absolute size is not of importance. If the imperfections appear as point objects and cannot be resolved by conventional optical techniques, then when they are used in an optical system (i.e., the imaging of the mask on the wafer), they will not be resolved.

The present prior art system of evaluating masks for pinholes and spots requires an operator to view the mask under high power magnification using transmitted light. This evaluates a mask for these imperfections and if care is used, the present system, in principle, is satisfactory but time consuming. However, for practical reasons, the technique is not satisfactory: (1) the evaluation is expensive because of the direct labor involved, and (2) there is the probability of a great deal of inspector subjectivity which is contained in the measurement. The present invention automatically scans the photographic mask for pinholes and spots to speed up the inspection process and eliminate operator subjectivity in the measurements.

SUMMARY

The present invention utilizes a microscope, a vidicon camera and logic circuitry to automatically inspect integrated circuit photographic masks for pinholes and spots. An optical system which is similar to the present system utilizes a microscope to form an image of the section of the photographic mask which is under inspection on the target of the vidicon camera tube. The image is scanned by the camera and electrical signals thus obtained are presented to the logic decision circuitry to determine an imperfection. The logic decision circuitry counts the total number of mask imperfections and provides an indication of the relative number of pinholes and spots in the photographic mask.

It is one object of the invention, therefore, to provide an improved integrated circuit photographic mask inspection apparatus for automatically detecting and counting pinholes and spots in a photographic mask.

It is another object of the invention to provide an improved integrated circuit photographic mask inspection apparatus for counting the total number of imperfections in the mask and providing an indication of the relative number of pinholes and spots.

It is yet another object of the invention to provide an improved integrated circuit photographic mask inspection apparatus which substantially reduces the required time for inspection of a photographic mask.

It is still another object of the invention to provide an improved integrated circuit photographic mask inspection apparatus which eliminates operator subjectivity from the inspection process.

These and other advantages, objects and features of the invention will become more apparent from the following detailed description when taken in conjunction with the illustrative embodiment in the accompanying drawings.

DESCRIPTION OF THE PREFERRED EMBODIMENT

Figure 1:
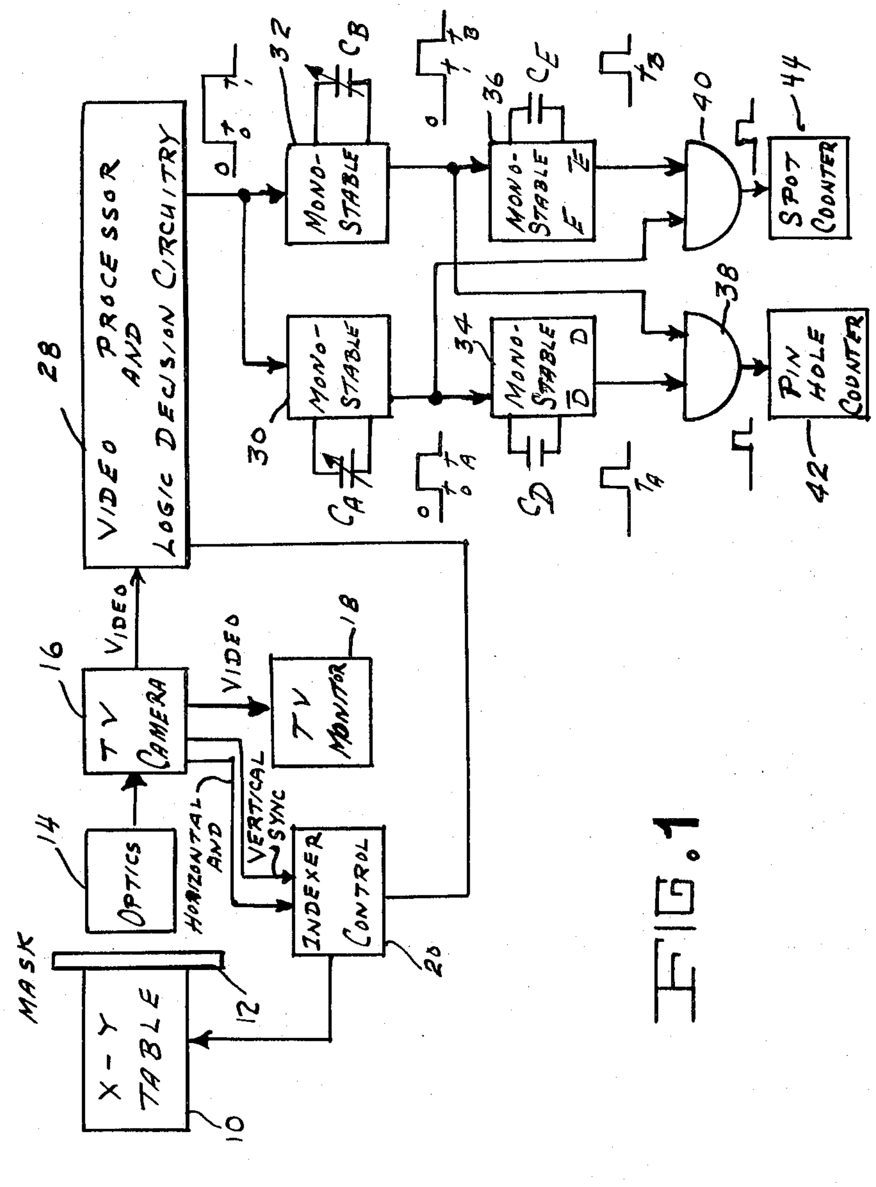
FIG. 1 is a block diagram of the integrated circuit photographic mask inspection apparatus in accordance with the present invention.

Referring now to FIG. 1, there is shown an integrated circuit photographic mask inspection apparatus utilizing X-Y table 10 to position integrated circuit photographic mask 12 with respect to the optics unit 14. The optics unit 14 may be a simple laboratory microscope which is in alignment with T.V. camera 16. A microscope with a 10X power would provide a field of view of 40 mils × 30 mils. It would therefore require approximately 3,350 fields of view to evaluate a 2 inch square mask. The automated indexing system requires a time of approximately 12 minutes to scan the entire mask. A portion of the photographic mask 12 is viewed by the T.V. camera 16 through the optics unit 14. The field of view of the microscope is converted by the T.V. camera 16 into electrical signals. A T.V. monitor 18 is provided to allow visual inspection of a particular section of the photographic mask if required and for initial alignment of the mask. An indexer control unit 20 is connected to the X-Y table unit 10 to control the position or section of the photographic mask 12 that is within the field of view of the optic unit 14. The indexer control unit receives vertical and horizontal sync signals from the T.V. camera 16 and controls the motion of the X-Y table. A three phase control is used to sequence the X-Y table in synchronism with the vertical frame rate of the T.V. camera. During the first phase, the T.V. camera scans the mask and the number of pinholes and spots are determined. The next phase indexes the X-Y table to the next field of view and the third phase is used to erase the previous image from the vidicon tube located in the T.V. camera. This process continues until the mask is completely inspected. The video signals are processed in the video processor 26 to eliminate noise and other unwanted interference signals and to provide pulses of a predetermined voltage level to appear at the output. The output pulses of the video processor and logic decision circuitry 28 are simultaneously applied to a pair of monostable multivibrators 30, 32. The output signals from the multivibrators 30, 32 are applied to a second pair of monostable multivibrators 34, 36. The output signals of multivibrators 32, 34 are applied to logic gate 38 whereupon an output pulse which represents a pinhole occurs when there is coincidence of the pulse outputs from the multivibrators 32, 34. The output of logic gate 38 is recorded, stored in pinhole counter 42, and the number of pinholes are displayed. The output pulses from multivibrators 30, 36 are applied to logic gate 40 which provides an output pulse when the input pulses are coincident. The output pulses from the logic gate 40 are counted stored in spot counter 44, and the number of spots are displayed. Thus, an integrated circuit photographic mask is automatically inspected for pinholes and spots.

Figure 2:
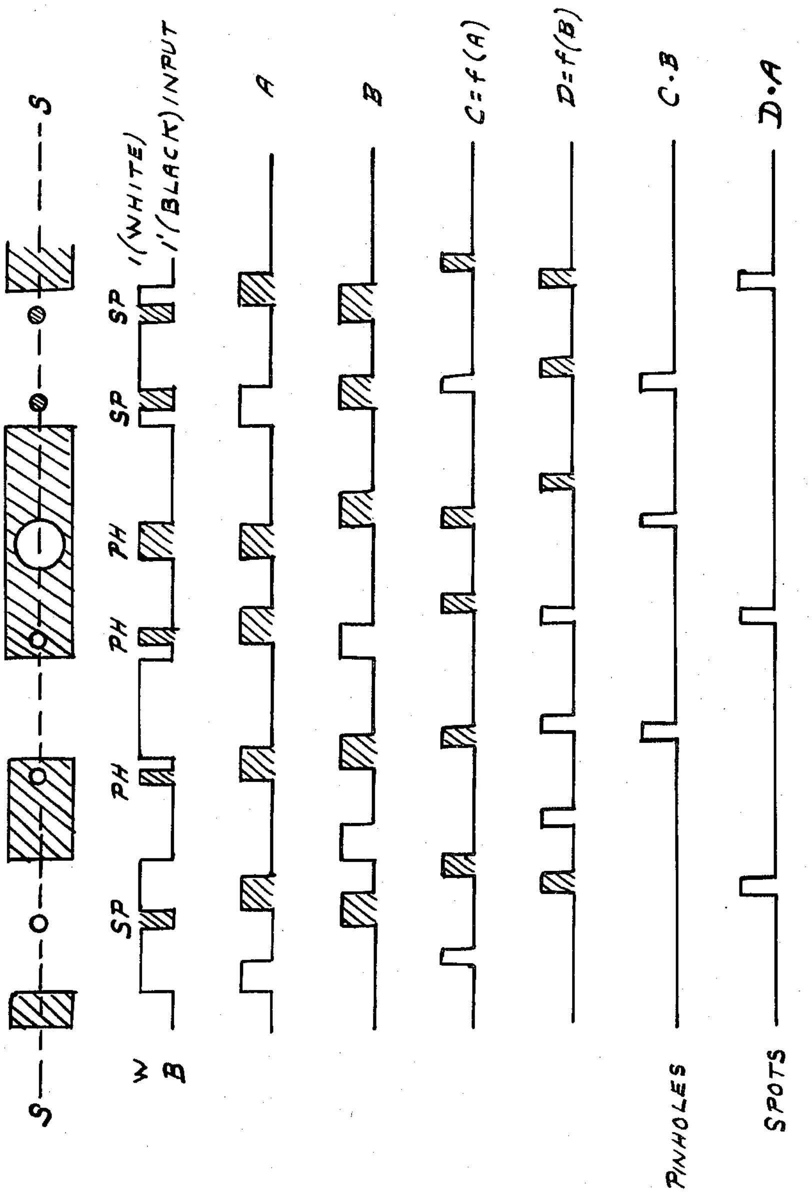
FIG. 2 is a graphic representation of the responses of the integrated circuit photographic mask inspection apparatus at the labelled points.

The operation of the automatic integrated circuit photographic mask inspection apparatus will be better understood when the following illustrative example is utilized in conjunction with the graphic representation of FIG. 2. In the first line of FIG. 2 is a typical mask pattern which contains several pinholes and spots. The input line demonstrates how the video information would appear for a single scan line such as S-S. This signal, of course, has undergone processing in the video processor and logic decision circuitry 28 to obtain a high signal to noise ratio and fast rise and fall times. Line A is a series of pulses which have been generated by the positive slopes of the input line. Line B is a series of pulses which have generated by any negative slopes. Lines C and D are also series of pulses which are generated respectively by the trailing edges of the A and B pulses. The decision circuitry is represented by the last two lines, C·B and D·A. If there is time coincidence between a pulse in line C with one in line B, then a pulse is generated which is used to count one pinhole. If there is time coincidence between a pulse in line D with one in line A, a spot is counted. Thus, for the given pattern, the circuitry has counted three pinholes and three spots and a total of six mask imperfections. In the present example, there are a few points to note. The second spot from the right was classified as a pinhole, and the second pinhole from the left was classified as a spot. In reality, the system has viewed the small opaque area of the pattern just before the pinhole as a spot, and the small clear area just before the spot as being a pinhole. This error in classification is inherent in a system of logic, and the magnitude of the error is a direct function of the width of the pulses generated in lines A and B. The error can be reduced by decreasing the width of the A and B pulses. However, the size of maximum pinhole and spot which may be counted, depends upon the size of the A and B pulses. At present, it appears that imperfections of the order of nine-tenth the size of the minimum pattern geometry would be a reasonable compromise. Regardless of the above, it should be clearly understood that the total number of imperfections counted by the system is correct, and that this is the number which determines whether the mask is good or bad. The individual counts of pinholes and spots provide a reasonably accurate indication of the relative distribution of those two imperfections.

In addition, it may be noted that the count of pinholes and spots are automatically weighted according to the size of the imperfection. An imperfection which covers one scan line or less will be counted once, whereas one which covers two lines will be counted twice. This type of weighting is completely reasonable in the determination of imperfections, since a single large imperfection must be regarded as important as several smaller imperfections.

Although the invention has been described with reference to a particular embodiment, it will be understood to those skilled in the art that the invention is capable of a variety of alternative embodiments within the spirit and scope of the appended claims.

We claim:

1. A photographic mask inspection apparatus for automatically inspecting integrated circuit photographic masks for pinholes and spots comprising in combination:

an optics system to provide a field of view of the photographic mask, a television camera in alignment with said optics system, said television camera scanning said field of view provided by said optics system, said field of view presenting an image on the target of said television camera, said image being processed by said television camera to provide video signals, and a video processor and logic decision circuit to receive and process said video signals, said video processor and logic decision circuit filtering and shaping said video signal to improve the signal to noise ratio of said video signal, said video signals being shaped into a train of pulses, said train of pulses being processed to determine the number of pinholes and spots, the number of pinholes being counted, stored, and displayed the number of spots being counted, stored and displayed also.

2. A photographic mask inspection apparatus as described in claim 1 further including an automated indexing system comprising in combination:

a X-Y table unit to support said photographic mask, said photographic mask being in alignment with said optics system, an indexer control unit to provide control signals to said X-Y table unit, said indexer control unit automatically controlling said X-Y table unit to step said photographic mask in a predetermined pattern before said optic system, said indexer control unit controlling the length of time said photographic mask is within the field of view of said optics system, and, also controlling the gate control signal to said logic decision circuit located in the video processor.

3. A photographic mask inspection apparatus as described in claim 1 wherein said optics system comprises a microscope having a power of 10X, said microscope being focused to provide a field of view of said photographic mask, said field of view being 40 mils × 30 mils.

* * * * *